Nov. 10, 1959     C. W. FRY     2,912,005

NEEDLE VALVE

Filed May 31, 1955

INVENTOR.
CLIFFORD W. FRY
BY
Oberlin & Limbach
ATTORNEYS

United States Patent Office 2,912,005
Patented Nov. 10, 1959

2,912,005

NEEDLE VALVE

Clifford W. Fry, Mansfield, Ohio, assignor to Certified Gas Equipment Corporation, Mansfield, Ohio, a corporation of Ohio Application May 31, 1955, Serial No. 512,180

1 Claim. (Cl. 137—614.11)

This invention relates, as indicated, to needle valves, and more specifically to a new and novel needle valve whereby the delivery rate of a fluid may be adjusted quickly, easily and precisely to a predetermined minimum value.

The needle valves presently known to the art are so constructed that as the needle of the valve is inserted into the orifice with which it is associated, the position at which it would permit the minimum desirable fluid flow through the orifice is difficult to locate because the pitch of the means which move the needle with respect to the orifice is not small enough. Thus, when a person tries to adjust the flow of gas in a burner on a gas range to the minimum rate at which the burner will remain lit, the flame often dies.

It is, therefore, the principal object of this invention to provide a valve which may be adjusted easily, rapidly and precisely for a predetermined minimum fluid flow therethrough.

It is a more particular object of this invention to provide a valve which may be adjusted to provide a continuum of rates of fluid flow therethrough and which may be adjusted easily, rapidly and precisely for a predetermined minimum rate of fluid flow therethrough.

Other objects and advantages of the present invention will become apparent as the following description proceeds.

To the accomplishment of the foregoing and related ends, said invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Broadly stated, my invention comprises a valve of the character described comprising a body provided with a fluid supply passage and two delivery passages connected with said supply passage, a first member for controlling fluid flow through said supply passage, a second member for controlling fluid flow through one of said delivery passages, and means connecting said first and second members whereby during at least a part of the movement of said first member said second member will be moved also, said means so arranged that for at least one position of said first member permitting fluid flow through said supply passage said second member will seal the delivery passage with which it is associated.

Figure 1:
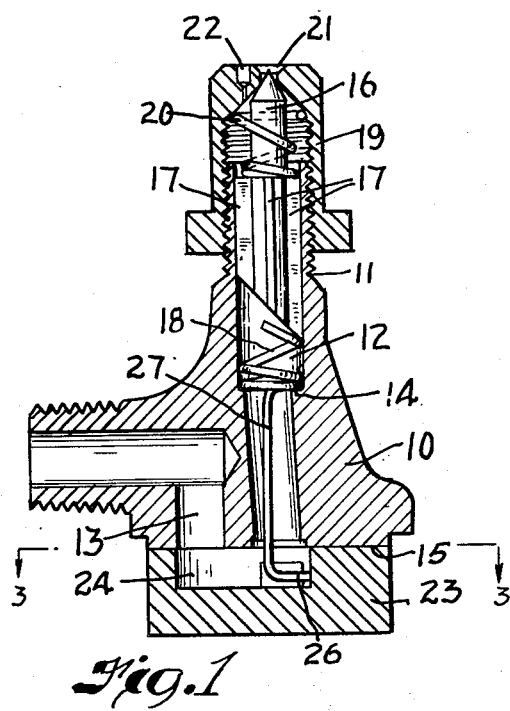
Fig. 1 is a longitudinal cross-sectional view of my invention.
Figure 2:
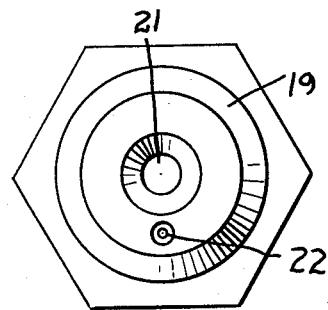
Fig. 2 is a plan view of the delivery end of my invention.
Figure 3:
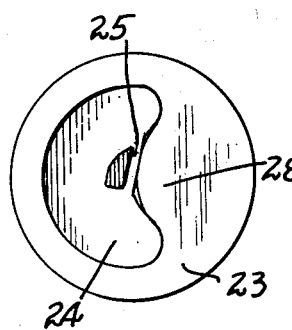
Fig. 3 is a view of my invention taken along the plane and in the direction substantially indicated by the line and the arrows at 3—3 in Fig. 1.

With reference now to Fig. 1 the needle valve of my invention is illustrated generally as comprising a body 10 having a barrel portion 11 thereof, a central passageway 12 extending axially of said barrel 11, and a supply passageway 13 in said body. The body 10 contains a seat 14 which extends into the passageway 12, and the passageway 12 extends from the side of the seat 14 remote from the barrel 11 at an angle to the axis of the barrel 11 terminating in a plane surface 15 on the bottom of the body 10. The supply passageway 13 also terminates in the plane surface 15. A needle member 16 having a plurality of axially extending fins 17 thereon is mounted in the passageway 12 with each of the fins 17 engaged in an axially extending slot in the wall of the passageway 12. A helical spring 18 is provided in the passageway 12 resting upon the seat 14 and having a portion of one helical turn thereof contacting one of the fins 17. An orifice cap 19 is screwed onto the barrel 11 and a helical spring 20 is provided resiliently urging the needle 16 away from the cap 19. An orifice 21 is provided in the cap 19 where the axis of the needle 16 intersects the cap 19, and an orifice 22 is provided in the cap 19 adjacent to the orifice 21 as illustrated more clearly in Fig. 2. A cap 23 having a crescent-shaped recess 24 therein is rotatably secured to the surface 15 of the body 10. The cap 23 contains a slot 25 therein which is adapted to receive a radially extending segment 26 of an extension 27 of the helical spring 18. Subsequently, in this specification the character 28 is used to designate the surface of the cap 23 which contacts the surface 15 of the body 10.

When the cap 23 is rotated, it effects rotation of the spring 18 which in combination with the spring 20 affects movement of the needle 16 toward and away from the orifice 21. That is, the surface of the spring 18 which contacts the fin 17 of the needle 16 acts as a cam moving the needle 16 as the spring 18 is rotated. When it is desirable to close the valve, the cap 23 is rotated to such a position that the surface 28 thereon seals the supply passageway 13. When the cap 23 is rotated to a position where the recess 24 connects the supply passageway 13 to the passageway 12, fluid will flow from the passageway 13 through the recess 24 and the passageway 12 and out of the orifices 21 and 22, the passageway 13 being connected to a pressurized reservoir of same fluid. A continuum of rates of fluid flow through the passageway 12 may be provided by further rotation of the cap 23, since such further rotation will cause different degrees of obstruction of the orifice 21 by the needle member 16. When the cap 23 is rotated to such a position, as illustrated in Fig. 1, that the recess 24 connects the supply passageway 13 to the passageway 12, and the needle 16 seals the orifice 21, the rate of fluid flow through the passageway 12 will be determined exclusively by the size of the orifice 22 the supply passageway 12 being connected to a given source of pressurized fluid. The size of the orifice 22 is therefore carefully chosen so that it will permit the desired minimum rate of fluid flow therethrough when connected to a given fluid source.

A variety of means may be used for rotating the cap 23. The particular means illustrated in Figs. 4 and 5 comprises a cylindrical shell 29 adapted to enclose the cap 23 and be secured to the body 10 of the valve by screws which extend through holes 30 in the shell 29. Inside the shell 29 is a disc 31 containing near its periphery an axially extending lug 32 which engages in a slot in the side of the cap 23 remote from the body 10 of the valve. Extending from the side of the disc 31 remote from the cap 23 are a plurality, here illustrated as three, of lugs 33 which are adapted to engage in corresponding slots 34 in the end of the shell 29. A spring, not illustrated, is provided between the disc 31 and the cap 23 so as to maintain the cap 23 firmly against the surface 15 of the body 10 while permitting the lugs 33 to be moved into and out of the slots 34. A hole is provided centrally in the end of the shell 29 and a shank 35 extends therethrough. One end of the shank 35 is connected by a rectangular lug 36 to the disc 31, and the other end of the shank 35 is connected to a suitable knob. A portion 37 of the periphery of the disc 31 is extended radially to contact a lug 38 on the inside of the shell 29 whereby rotation of the disc 31 is limited to less than 360 degrees.

It should here be noted that the radius of each of the different lugs 33 from the axis of the disc 31 is different so that each lug 33 may be moved through its complete rotational path without engaging in the slots 34 corresponding to the other lugs 33. The lug 38 is so situated that when one end of the portion 37 of the disc 31 contacts the lug 38, each lug 33 will engage in its corresponding slot 34.

In the preferred assembly of my invention, the relative positions of the lug 32 and the slot 26 and the shape of the spring cam 18 are such that when the lugs 33 are engaged in the slots 34, the surface of the cap 23 seals the supply passage 13, and the needle 16 is completely withdrawn from the orifice 21.

Figure 4:
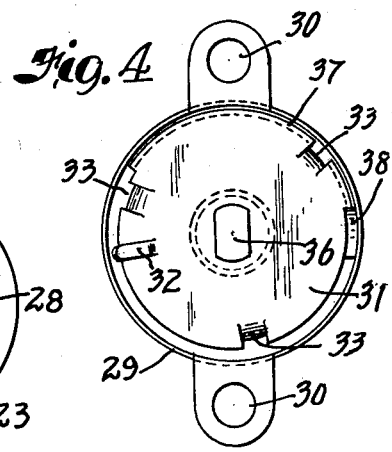
Fig. 4 is an axial view of the means of my invention by which the member illustrated in Fig. 3 is rotated, this figure illustrating the side of said means which is adjacent to the member of Fig. 3.

When the valve is to be turned on, the lugs 33 are disengaged from the slots 34 and the disc 31 is rotated counterclockwise as illustrated in Fig. 4.

The effect of the rotation of the disc is to simultaneously move the recess 24 in the cap 23 opposite the supply passageway 13, and move the point of the needle member 16 into the orifice 21. Thus the maximum rate of fluid flow through the passage 12 will occur as soon as the supply passageway 13 is connected to the passageway 12 by the recess 24. Further counterclockwise rotation of the disc 31 will result in movement of the point of the needle member 16 into the orifice 21 whereby the rate of fluid flow through the passageway 12 is reduced. When the disc 31 is rotated far enough that the needle member 16 seals the orifice 21, the rate of fluid flow through the passageway 12 will be at a minimum determined by the size of the orifice 22.

The size of the portion 37 of the periphery of the disc 31 is carefully chosen so that the angle which it subtends at the center of the disc 31 will restrict the rotation of the disc 31 to a given path. Therefore, when one end of the portion 37 contacts the lug 38, as illustrated in Fig. 4, the surface 28 of the cap 23 will seal the supply passageway 13 while the needle member 16 is completely withdrawn from the orifice 21, and when the other end of the portion 37 contacts the lug 38, the recess 24 in the cap 23 will connect the supply passageway 13 to the passageway 12 while the needle member 16 seals the orifice 21.

Figure 5:
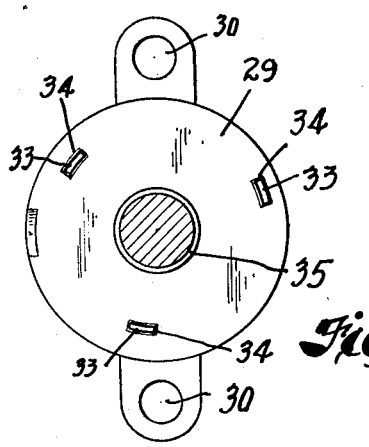
Fig. 5 is an axial view of the side of the means illustrated in Fig. 4 which is remote from the member illustrated in Fig. 3.

Restating the discussion above in simplified form, the knob on the shank 35 in Fig. 5 is pressed toward the body of the valve, thereby disengaging the lugs 33 from the slots 34. As the knob is then rotated clockwise, the valve opens to permit a maximum rate of fluid flow therethrough. Further clockwise rotation of the knob and shank results in a decrease in the rate of fluid flow through the valve until the portion 37 of the disc 31 in Fig. 4 strikes the lug 38, at which point the needle member 16 seals the orifice 21 and the rate of fluid flow through the valve is determined by the size of the orifice 22.

An alternative form of my invention comprises reversing the spiral of the spring cam 18 and locating the slot 25 in such a position that when the lugs 33 are engaged in the slots 34 and the surface 28 of the cap 23 seals the passageway 13, the needle member 16 seals the orifice 21 and the spring cam 18 is under substantial compression. When, in this form of my invention, the shank 35 is initially rotated clockwise as illustrated in Fig. 5, the supply passageway 13 is connected to the passageway 12 by the recess 24, but the compression of the spring cam 18 keeps the needle member 16 tightly in the orifice 21. At this point the rate of fluid delivery from the valve is determined by the size of the orifice 22. Further clockwise rotation of the shank 35 does not affect the rate of fluid delivery from the valve until the compression of the spring cam 18 is reduced to a point where the spring 20 can force the needle member out of the orifice 21. Further clockwise rotation of the shank 35 results in movement of the needle member 16 out of the orifice 21 and hence an increase in the rate of fluid flow through the valve.

My invention provides means for rapidly, easily and precisely adjusting the rate of fluid flow through a valve to a predetermined minimum value.

The valves of my invention are devised so that either the maximum delivery rate or the predetermined minimum delivery rate of the valve may be obtained when the valve is initially turned on.

Other modes of applying the principle of the invention may be employed, change being made as regards the details described, provided the features stated in any of the following claims or the equivalent of such be employed.

I, therefore, particularly point out and distinctly claim as my invention:

A valve of the character described comprising a body provided with a supply passage therein which terminates in a plane surface on the exterior of said body, a chamber in said body which terminates in said plane surface, and two delivery passages connected with said chamber; a disc rotatably secured to said plane surface, said disc having in the side thereof adjacent to said plane surface a recess adapted, during a part of its rotational path, to connect said terminal ends of said supply passage and said chamber; a needle having a cam surface thereon nonrotatably mounted in said chamber axially movable into and out of one of said delivery passages; spring means resiliently urging said needle away from the delivery passage with which it is associated; a helical spring coaxial with said needle and restrained against axial displacement away from delivery passage, said spring having at least a portion of one helical turn thereof in contact with said cam surface; and means connecting said helical spring to said disc whereby rotation of said disc affects rotation of said helical spring, said means being so arranged that for at least one position of said disc, when said recess therein connects said supply passage and said chamber, said helical spring will press against said cam surface with sufficient force to affect a seal between said needle and the delivery passage with which it is associated.

References Cited in the file of this patent

UNITED STATES PATENTS

| | | |
|---|---|---|
| 1,695,848 | Higgins | Dec. 28, 1928 |
| 2,183,825 | Steffen | Dec. 19, 1939 |
| 2,721,053 | Fry | Oct. 18, 1955 |
| 2,765,809 | Lamar | Oct. 9, 1956 |

FOREIGN PATENTS

| | | |
|---|---|---|
| 105,221 | Sweden | Aug. 11, 1942 |